US007040479B2

(12) United States Patent
Fochler et al.

(10) Patent No.: US 7,040,479 B2
(45) Date of Patent: May 9, 2006

(54) ERECTING BOX BLANKS ON A CONVEYOR

(75) Inventors: Fritz Fochler, Senden (DE); Andreas Krüger, Donaurieden (DE)

(73) Assignee: Uhlmann Pac-Systeme GmbH & Co. KG, Laupheim (DE)

(*) Notice: Subject to any disclaimer, the term of this patent is extended or adjusted under 35 U.S.C. 154(b) by 366 days.

(21) Appl. No.: 10/634,680

(22) Filed: Aug. 5, 2003

(65) Prior Publication Data

US 2004/0089517 A1 May 13, 2004

(30) Foreign Application Priority Data

Aug. 7, 2002 (DE) ................................ 102 36 069

(51) Int. Cl.
*B65G 25/00* (2006.01)

(52) U.S. Cl. .................................... 198/409; 198/468.4

(58) Field of Classification Search ................ 198/409, 198/468.2

See application file for complete search history.

(56) References Cited

U.S. PATENT DOCUMENTS

| | | | | |
|---|---|---|---|---|
| 4,518,301 | A | 5/1985 | Greenwell | |
| 4,881,934 | A | 11/1989 | Harston | |
| 5,215,515 | A | 6/1993 | Bershadsky | |
| 5,249,663 | A * | 10/1993 | McCoy et al. | 198/468.2 |
| 5,257,888 | A | 11/1993 | Kronseder | |
| 5,431,274 | A | 7/1995 | Schaupp | |
| 6,503,180 | B1 | 1/2003 | Pluschow | |

FOREIGN PATENT DOCUMENTS

| | | |
|---|---|---|
| DE | 42 24 897 | 6/1993 |
| EP | 0331325 | 9/1989 |
| EP | 0580958 | 2/1994 |
| EP | WO-03.020615 | 3/2003 |

* cited by examiner

*Primary Examiner*—Joe Dillon, Jr.
(74) *Attorney, Agent, or Firm*—Herbert Dubno; Andrew Wilford

(57) ABSTRACT

A supply holds a flattened box blank above a conveyor passing having a succession of box seats, and a planet carrier is rotated by its own drive about a sun axis between the supply and the conveyor. A single planetary element on the carrier offset from the sun axis is rotatable about a planet axis parallel to and offset from the sun axis. A grab on the planetary element is engageable with the blank in the supply and in the conveyor seats. A planet drive wheel is fixed to the planetary element, a sun wheel is rotatable about the sun axis, and the wheels are coupled together for joint synchronous rotation. A separate planetary drive connected to the sun wheel rotates the planetary element independently of the carrier such that the grab moves while orbiting about the sun axis through a closed asymmetric path having only two outer points.

10 Claims, 9 Drawing Sheets

ERECTING BOX BLANKS ON A CONVEYOR

FIELD OF THE INVENTION

The present invention relates to an apparatus for erecting flat box blanks. More particularly this invention concerns such an apparatus that simultaneously erects the box blanks, that is expands them three dimensionally, and sets them in seats on a conveyor.

BACKGROUND OF THE INVENTION

A standard apparatus for erecting box blanks comprises a supply holding a stack of flattened box blanks, a conveyor passing adjacent the supply and having a succession of box seats, and a planet carrier rotatable about a sun axis between the supply and the conveyor. Several planetary elements on the carrier offset from the sun axis have axially spaced inner and outer ends and are rotatable about a planet axis parallel to and offset from the sun axis. Grabs on the planetary-element outer ends are engageable with the blank in the supply and engageable in the conveyor seats. A planet drive gear fixed to the planetary-element inner end is rotatable with the planetary element about the planet axis.

According to German 42 24 897 a differential drive including a sun wheel rotatable about the sun axis and meshing with all of the planet gears moves the planetary element and the carrier such that the grabs follow a hypocycloidal path having for each grab a respective outer point. Thus each grab engages the end flattened blank in the supply, pulls it out, then swings it through an arc to deposit it in one of the seats or cells of the conveyor and then swings through a further arc to return to the starting position. During this movement the blank is opened up or erected into its three-dimensional shape.

The problem with such a system is that the large symmetrical paths followed by the plural grabs take up a great deal of space. Several grabs are needed, however, to keep up with production pace, since each grab moves through a long complex path between its actual end-point use positions. In addition resetting the machine to work with box blanks of different format is a fairly complex task that takes quite some time, as each of the grabs has to be adjusted and reset. The grabs driven from a common sun gear have to be set perfectly so that each does its function when it moves into position between the supply and the conveyor.

Accordingly U.S. Pat. No. 4,518,301 of Greenwell shows a system for taking flattened box blanks out of a supply and transferring them to a conveyor. The blanks are erected as they are moved between the supply and the conveyor by a system having several grabs whose angular positions are controlled by a complex cam system. Such an arrangement is also extremely difficult to reset when the size of the blanks being handled changes.

OBJECTS OF THE INVENTION

It is therefore an object of the present invention to provide an improved box-erecting and -transferring system.

Another object is the provision of such an improved box-erecting and -transferring system which overcomes the above-given disadvantages, that is which is relatively compact and also quite easy to reset when box size changes.

SUMMARY OF THE INVENTION

An apparatus has according to the invention a supply holding a flattened box blank, a conveyor passing in a transport direction adjacent the supply and having a succession of box seats spaced apart in the direction, and a planet carrier rotatable about a sun axis between the supply and the conveyor. A single planetary element on the carrier offset from the sun axis has axially spaced inner and outer ends and is rotatable about a planet axis parallel to and offset from the sun axis. A grab on the planetary-element outer end is engageable with the blank in the supply and in the conveyor seats. A planet drive wheel fixed to the planetary-element inner end is rotatable with the planetary element about the planet axis, a sun wheel is rotatable about the sun axis, and the wheels are coupled together for joint synchronous rotation. A carrier drive connected to the carrier rotates the carrier about the sun axis such that the planetary element orbits about the sun axis, and a separate planetary drive connected to the sun wheel rotates the planetary element about the planet axis independently of the carrier such that the grab moves while orbiting about the sun axis through a closed asymmetric path having only two outer points. The grab engages the blank in the supply in one of the outer points and presses the blank into one of the seats in the other of the outer points.

This system has the advantage that the path of the grab is not predetermined by the mechanism of the apparatus, but can be controlled and influenced actively by its own drive connected to the sun wheel. As a result it can follow the defined asymmetrical path having one outer end point in which it engages the box blank in the supply and another in which it deposits the erected blank in the conveyor. Movement of the grab between these end points is not through a large arc or circle, but can be constrained to a limited area in fact wholly within a circle defined by the end points and having a center on the sun axis. In other words the grab can be moved through relatively short paths between its end points. As a result a single grab can do the work that is done in a prior-art machine by several grabs that must move through big looping hypocycloidal paths.

Furthermore when the format is changed, it is not necessary to make complex changes in the gears and/or cams of the device. Instead the drives are simply operated differently to make the pickups and dropoffs of the box blanks at the desired new locations.

The planetary drive according to the invention is a stepper. For more flexibility however, it can be a servomotor. In this latter case the servomotor steps the planetary element angularly about the planet axis. Thus, using standard control technology, it is possible to make the grab follow virtually any asymmetrical path. One is not limited to movements defined by meshing gears or cams.

The planetary drive means orients the grab relative to the planet axis at about 120° offset positions in the outer points. Thus the supply can be a downwardly open chute which is oriented at a 120° angle to the horizontal transport direction of the conveyor. In the pickup end point, the grab is directed in line into the supply, and in the dropoff end point it in pointing straight down.

The conveyor is provided with leading uprights movable in the direction and sliding uprights movable relative to the leading uprights. Each cell has one of the leading uprights and on of the sliding uprights. Thus as the flattened box blank is swung into one of the cells, it can engage the slidable uprights of that cell and move them forward as the box is erected. Once the box is fully erected, that is of rectangular parallelepipedal shape, it is bearing on the leading upright also. This arrangement not only facilitates erection of the boxes, but makes the system easy to adapt to boxes of different sizes.

The planetary drive is of variable speed but always rotates the planetary element in the same rotational sense according to the invention. In fact the variability in speed is normally limited to the planetary drive to simplify operation. Normally the carrier drive means rotates the carrier in a rotational sense opposite that of a rotational sense imparted to the planetary element by the planetary drive.

The planetary element according to the invention is L-shaped and has a main leg extending along the planetary axis and a transverse leg extending generally perpendicular from the main leg and having the outer end carrying the grab.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
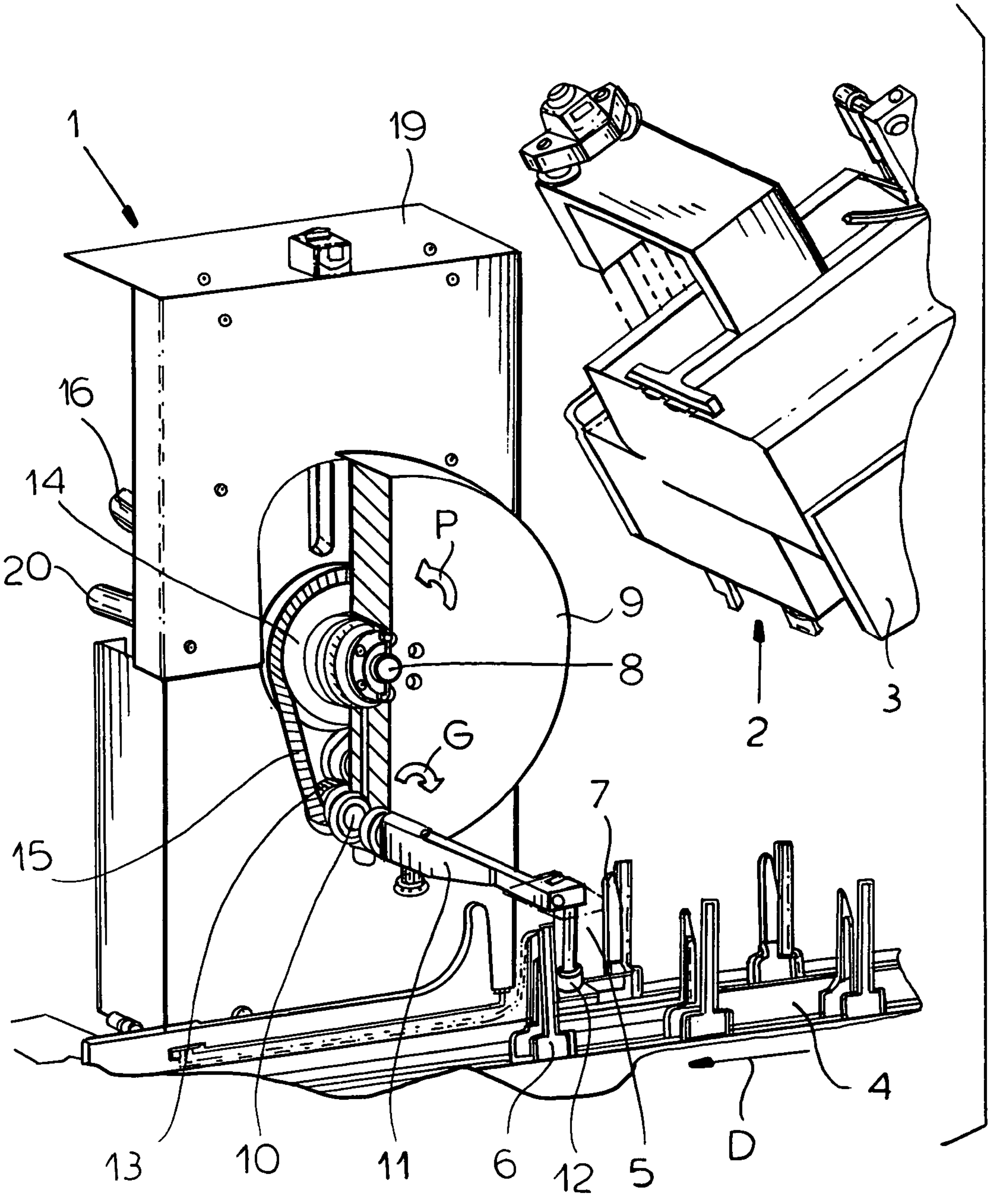
FIG. 1 is a partly schematic and sectional perspective view of the apparatus according to the invention.
Figure 2:
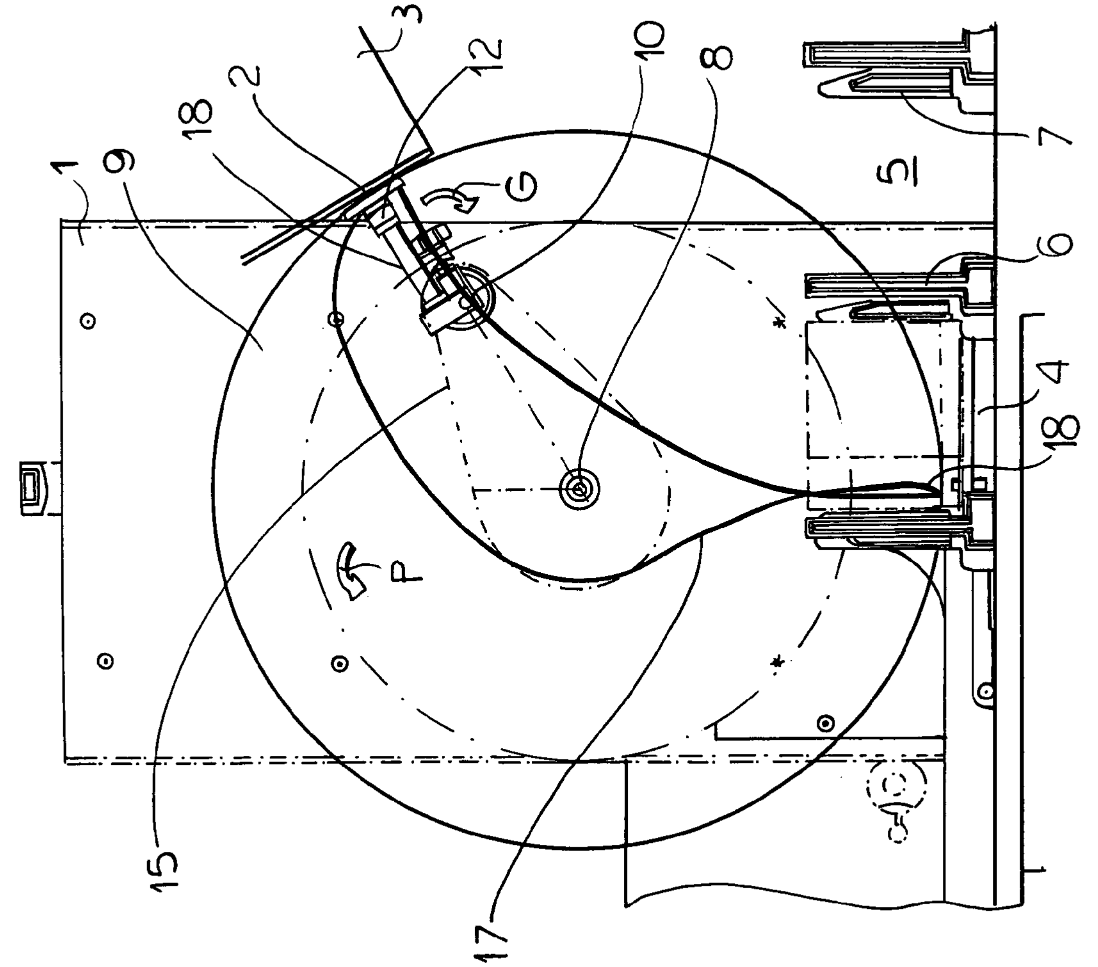
FIGS. 2 through 9 are side schematic views illustrating successive operating positions of the apparatus.
Figure 3:
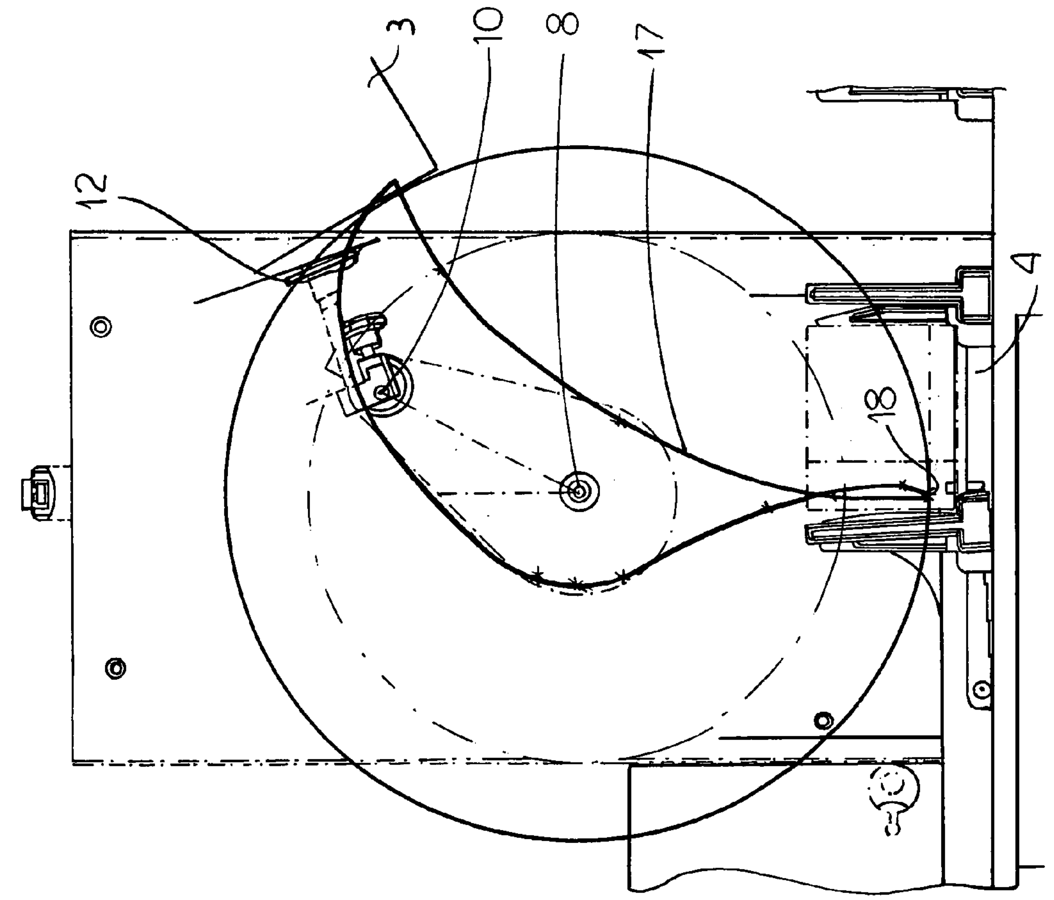
Figure 4:
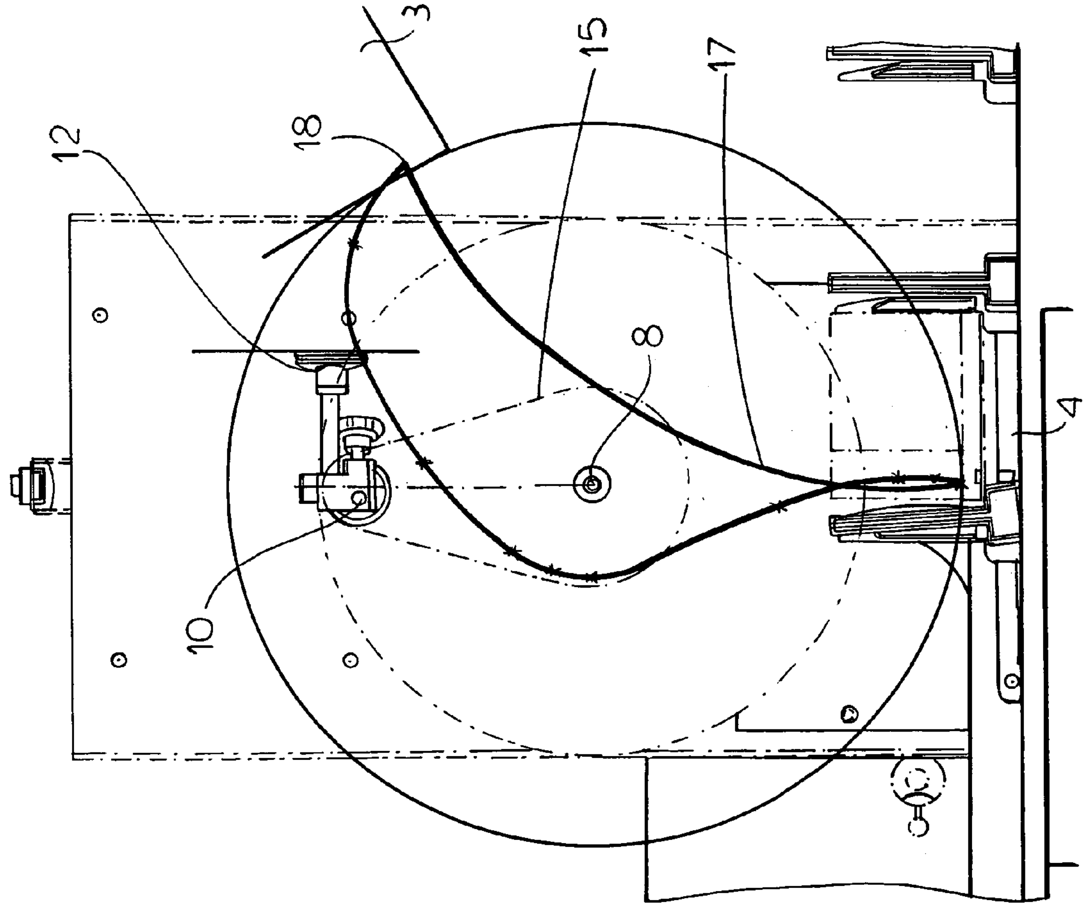
Figure 5:
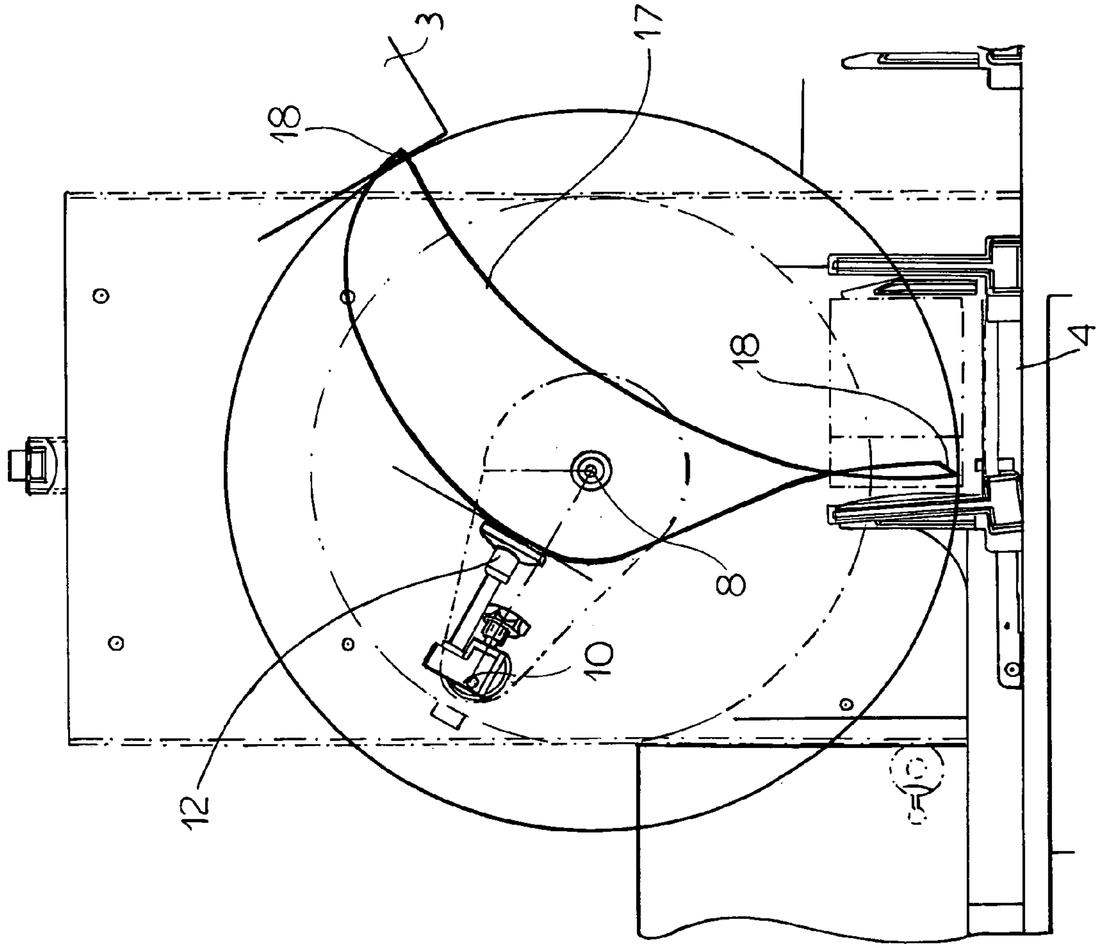
Figure 6:
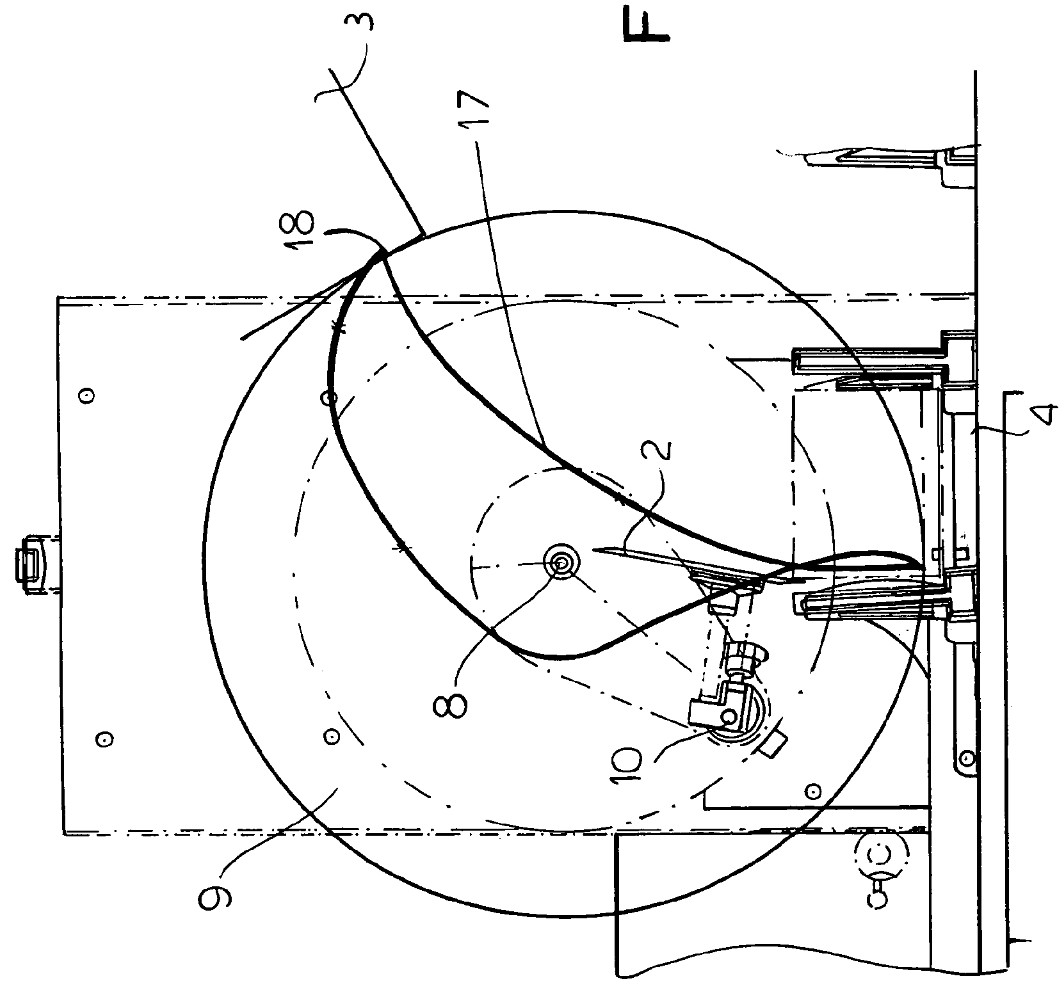
Figure 7:
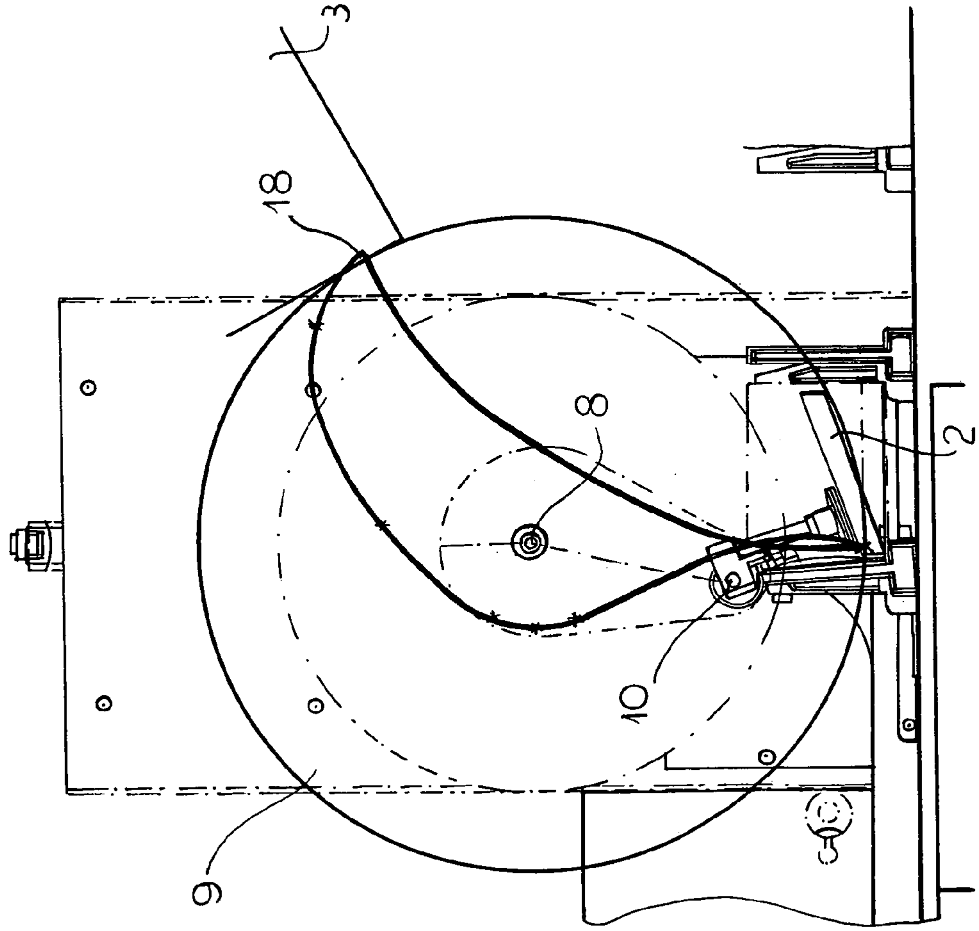
Figure 8:
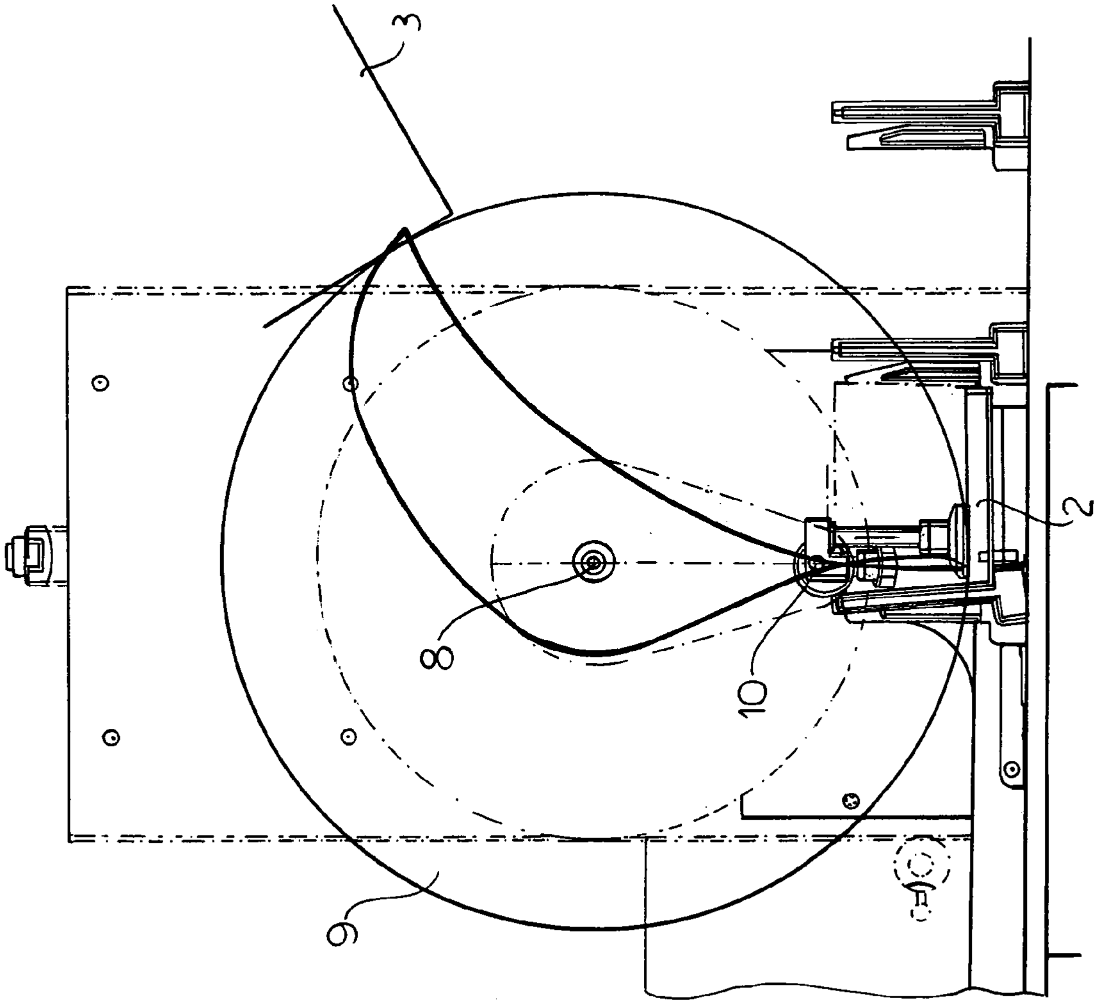
Figure 9:
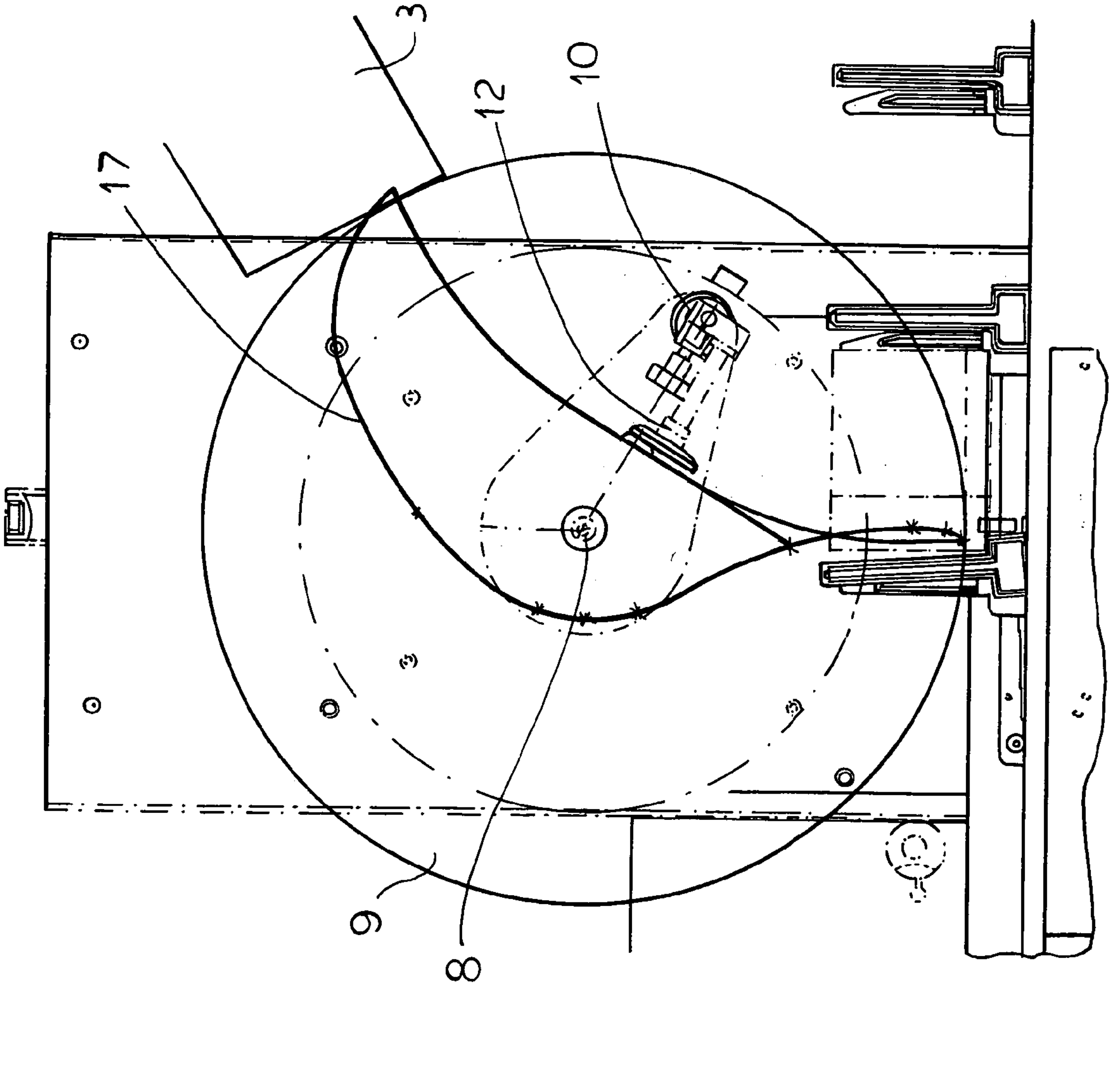

As seen in FIG. 1 an apparatus 1 according to the invention serves for pulling flat box blanks 2 out of an angled, downwardly open supply chute 3, for erecting them, and for placing them in cells 5 formed on a conveyor 4 by uprights 6 and 7. The conveyor 4 moves in a horizontal transport direction D to carry off the erected blanks 2.

The apparatus 1 basically comprises a frame 19 supporting a planet carrier 9 for rotation about a horizontal sun axis 8 perpendicular to the direction D above the conveyor 4. A planetary arm 11 is rotatable on the carrier 9 about a planetary axis 10 parallel to but offset from the axis 8 and has an outer end carrying a suction-type grab 12 that can stick to and hold the blanks 2. This arm 11 projects through the carrier 9 and carries a gear or sprocket 13 connected by a chain or belt 15 to another spear or sprocket 14 rotatable about the axis 8 so that the planet arm 11 can be rotated by a drive shown schematically at 16 in a direction G (here clockwise) that is opposite to a rotation direction P (here counterclockwise) for the carrier 9 which is effected by a drive shown schematically at 20.

The drive 20 is completely independent of the drive 16 and can rotate the planetary carrier 9 in a direction and at a speed wholly independent of the direction and speed that the drive 16 applies to the planetary element 11. Normally the drive 20 rotates the carrier in a counterclockwise direction P and the drive 16 rotates the element 11 in a clockwise direction G, but at a varying rate.

Thus the grab 12 is moved through an asymmetrical path 17 having a pair of outer points 18 offset by 120° relative to the axis 8. As a result of this asymmetrical shape, there is only one planetary element 11 on the carrier 9, unlike the prior-art systems, but it is able to operate at high speed and transfer blanks 2 from the downwardly open supply chute 3 to the cells 5.

An illustrated successively in FIGS. 2 through 9 the grab 12 in one of its outermost positions 18 (FIG. 2) in pressed flatly against the lowermost blank 2 in the supply 3. The grab

12 is then swung around the axis 8 through an arc (FIGS. 3 and 4) until the edge of the blank engages the slidable uprights 6 of one of the cells 5, whereupon further movement into the other end position 18 (FIG. 8) erects the box and sets it down flatly in the seat 5. The grab 12 then releases (FIG. 9) and swings back up, on an inward arc that keeps it out of the way of the structure of the following cell 5, until it regains the FIG. 2 position and the cycle can restart. With different box sizes, the blank 2 engages the frontmost abutment uprights 7 and is set up by them.

We claim:

1. An apparatus comprising:

a supply holding a flattened box blank;

a conveyor passing in a transport direction adjacent the supply and having a succession of box seats spaced apart in the direction;

a planet carrier rotatable about a sun axis between the supply and the conveyor;

a single planetary element on the carrier offset from the sun axis, having axially spaced inner and outer ends, and rotatable about a planet axis parallel to and offset from the sun axis;

a grab on the planetary-element outer end engageable with the blank in the supply and engageable in the conveyor seats;

a planet drive wheel fixed to the planetary-element inner end and rotatable with the planetary element about the planet axis;

a sun wheel rotatable about the sun axis;

means coupling the wheels together for joint synchronous rotation;

carrier drive means connected to the carrier for rotating the carrier about the sun axis such that the planetary element orbits about the sun axis; and planetary drive means separate from the carrier drive means and connected to the sun wheel for rotating the planetary element about the planet axis independently of the carrier such that the grab moves while orbiting about the sun axis through a closed asymmetric path having only two outer points, the grab engaging the blank in the supply in one of the outer points and pressing the blank into one of the seats in the other of the outer points.

2. The apparatus defined in claim 1 wherein the planetary drive means includes a stepping motor.

3. The apparatus defined in claim 1 wherein the planetary drive means includes a servomotor.

4. The apparatus defined in claim 3 wherein the servomotor steps the planetary element angularly about the planet axis.

5. The apparatus defined in claim 1 wherein the planetary drive means orients the grab relative to the planet axis at about 120° offset positions in the outer points.

6. The apparatus defined in claim 1 wherein the conveyor is provided with leading uprights movable in the direction and sliding uprights movable relative to the leading uprights, each cell having one of the leading uprights and one of the sliding uprights.

7. The apparatus defined in claim 1 wherein the planetary drive means is of variable speed but always rotates the planetary element in the same rotational sense.

8. The apparatus defined in claim 1 wherein the carrier drive means rotates the carrier in a rotational sense opposite that of a rotational sense imparted to the planetary element by the planetary drive.

9. The apparatus defined in claim 1 wherein the supply is a downwardly inclined chute.

10. The apparatus defined in claim 1 wherein the element is L-shaped and has a main leg extending along the planetary axis and a transverse leg extending generally perpendicular from the main leg and having the outer end carrying the grab.

* * * * *